United States Patent
Lenain et al.

(10) Patent No.: US 9,849,747 B2
(45) Date of Patent: Dec. 26, 2017

(54) METHOD FOR REDUCING THE RISK OF ROLLOVER OF AN AUTOMOTIVE VEHICLE PROVIDED WITH A CONTROLLABLE SUSPENSION SYSTEM

(71) Applicants: UNIVERSITE BLAISE PASCAL-CLERMONT II, Clermont-Ferrand (FR); INSTITUT NATIONAL DE RECHERCHE EN SCIENCES ET TECHNOLOGIES POUR L'ENVIRONNEMENT ET L'AGRICULTURE, Antony (FR)

(72) Inventors: Roland Lenain, Saint Bonnet Pres Orcival (FR); Nicolas Bouton, Perignat Les Sarlieves (FR); Mathieu Richier, Clermont-Ferrand (FR); Dieumet Denis, Clermont-Ferrand (FR); Benoit Thuilot, Chamalieres (FR)

(73) Assignees: UNIVERSITE BLAISE PASCAL—CLERMONT II, Clermont-Ferrand (FR); INSTITUT NATIONAL DE RECHERCHE EN SCIENCES ET TECHNOLOGIES POUR L'ENVIRONNEMENT ET L'AGRICULTURE, Antony (FR)

( * ) Notice: Subject to any disclaimer, the term of this patent is extended or adjusted under 35 U.S.C. 154(b) by 0 days.

(21) Appl. No.: 14/780,097

(22) PCT Filed: Mar. 26, 2014

(86) PCT No.: PCT/EP2014/056011
§ 371 (c)(1),
(2) Date: Nov. 3, 2015

(87) PCT Pub. No.: WO2014/154724
PCT Pub. Date: Oct. 2, 2014

(65) Prior Publication Data
US 2016/0046167 A1 Feb. 18, 2016

(30) Foreign Application Priority Data
Mar. 26, 2013 (FR) .................................... 13 52736

(51) Int. Cl.
*B60G 17/016* (2006.01)

(52) U.S. Cl.
CPC ....... *B60G 17/0162* (2013.01); *B60G 17/016* (2013.01); *B60G 2300/08* (2013.01);
(Continued)

(58) Field of Classification Search
CPC ............ B60G 17/0162; B60G 2400/63; B60G 2800/965; B60G 2800/9122; B60G 2800/9124
See application file for complete search history.

(56) References Cited

U.S. PATENT DOCUMENTS

| | | | |
|---|---|---|---|
| 5,825,284 A | 10/1998 | Dunwoody et al. | |
| 2002/0056582 A1* | 5/2002 | Chubb | ................ B60R 16/0233 180/197 |

(Continued)

OTHER PUBLICATIONS

R. Rajamani, D. Piyabongkarn, V. Tsourapas, J.Y. Lew; "Real-Time Estimation of Roll Angle and CG Height for Active Rollover Prevention Applications." 2009 American Control Conference, Hyatt Regency Riverfront, St. Louis, MO; Jun. 10-12, 2009.*

(Continued)

*Primary Examiner* — Redhwan K Mawari
*Assistant Examiner* — Anshul Sood
(74) *Attorney, Agent, or Firm* — Young & Thompson

(57) ABSTRACT

A method for reducing the rollover risk of an automotive vehicle includes:
a first step of calculating, on the basis of a plurality of signals delivered by sensors (28, 29) of the controllable suspension system, a measured quantity (TCm) as an active value (TC) of a load transfer;
(Continued)

a second step of calculating an estimated quantity (TCe), on the basis of signals delivered by kinematic sensors (50-58) placed onboard the vehicle and a dynamic model of the vehicle, the estimated quantity being taken as an active value of the load transfer when the measured quantity is not available;

a step of evaluating the rollover risk on the basis of the active value (TC) of the load transfer; and, in the event of increased rollover risk; and a step of the emission of a safety signal (S).

12 Claims, 3 Drawing Sheets

(52) U.S. Cl.
CPC ............... *B60G 2400/0521* (2013.01); *B60G 2400/0522* (2013.01); *B60G 2400/0523* (2013.01); *B60G 2400/60* (2013.01); *B60G 2400/63* (2013.01); *B60G 2800/0124* (2013.01); *B60G 2800/70* (2013.01); *B60G 2800/9124* (2013.01)

(56) References Cited

U.S. PATENT DOCUMENTS

2007/0162204 A1* 7/2007 Moshchuk ............ B60W 30/04
701/38
2009/0177346 A1* 7/2009 Hac ..................... B60W 30/045
701/31.4

OTHER PUBLICATIONS

Joop Pauwelussen et al.: "Predict the road to prevent roll-over, using the navigation database", Intelligent Vehicles Symposium, 2008 IEEE, IEEE, Piscataway, NJ, USA, Jun. 4, 2008 (Jun. 4, 2008), pp. 944-949, XP031318862, ISBN: 978-1-4244-2568-6 p. 945, paragraph 3—p. 946.

International Search Report, dated Apr. 17, 2014, from corresponding PCT application.

FR Search Report, dated Oct. 11, 2013, from corresponding FR application.

\* cited by examiner

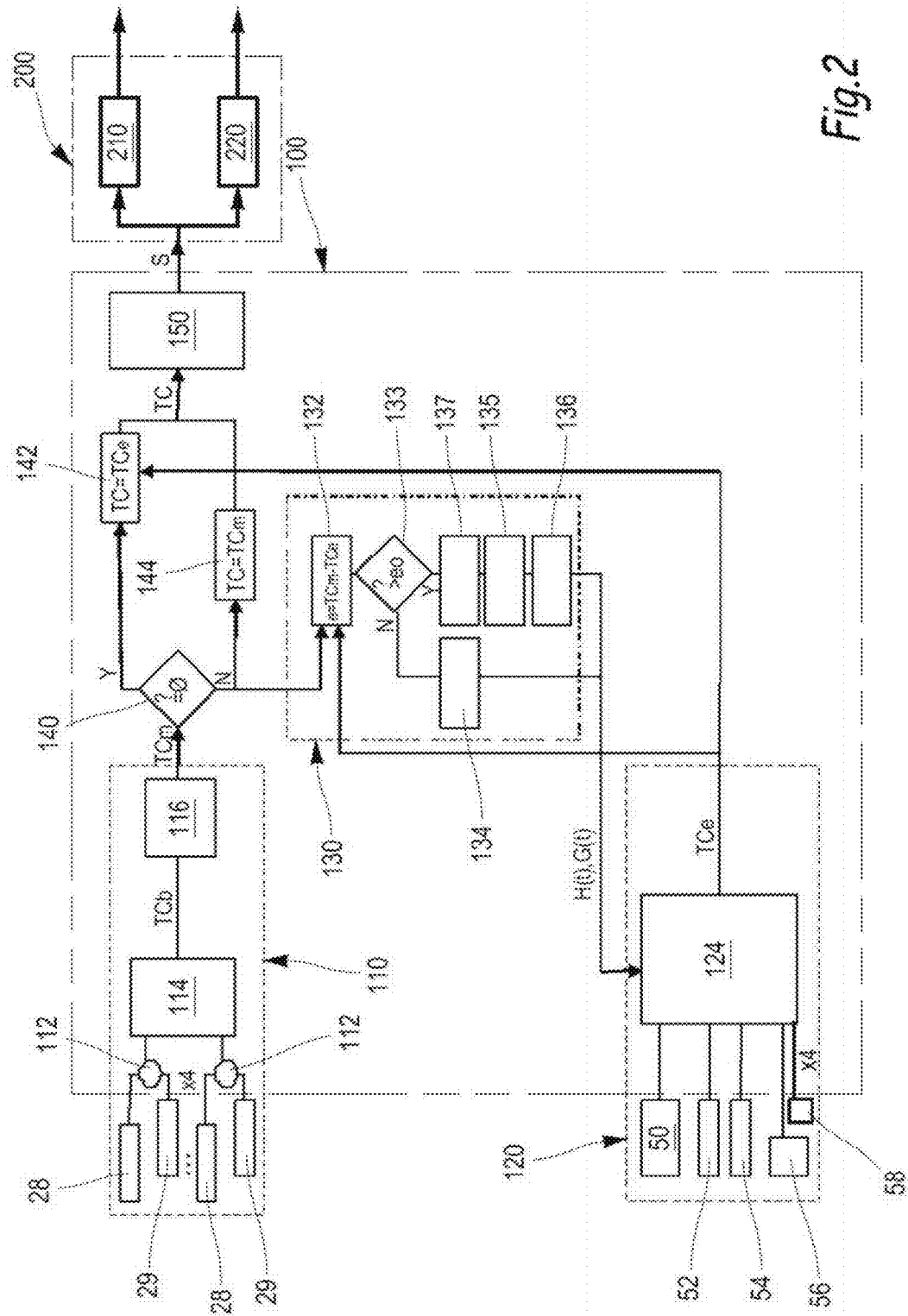

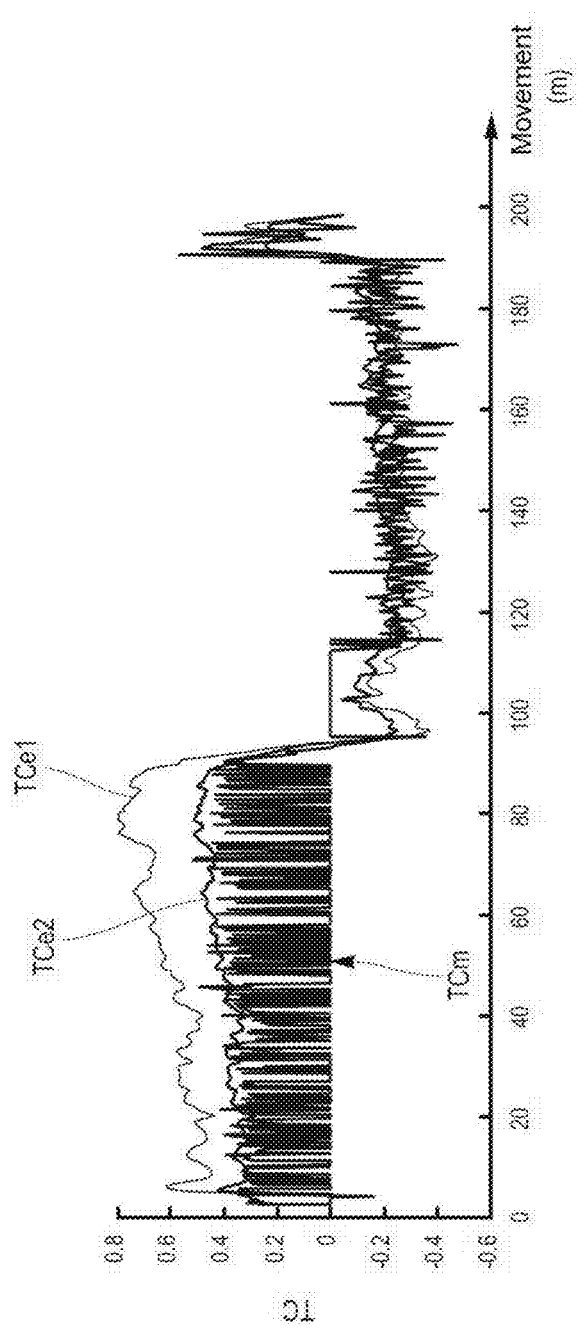

METHOD FOR REDUCING THE RISK OF ROLLOVER OF AN AUTOMOTIVE VEHICLE PROVIDED WITH A CONTROLLABLE SUSPENSION SYSTEM

The invention relates to the field of methods and systems for the active management of the usage safety of an automotive vehicle, so as to prevent the latter from rolling over during use.

In the present document, an automotive vehicle refers to any vehicle including a propulsion means that has a risk of lateral tipping during use. This may for example be in an agricultural vehicle used on sloping land, and the load of which may vary significantly, the height of the center of gravity of which may be modified by the driver by actuating a control means for the active suspensions.

The invention more particularly relates to methods and systems for an automotive vehicle equipped with a controllable suspension system.

In the present document, a controllable suspension system is any system making it possible to modify, at a constant total mass, the position of the center of gravity of the vehicle. This may for example involve a system for correcting the attitude of the active suspensions making it possible to couple the wheels to the chassis of the vehicle. Such an active suspension may be hydraulic, pneumatic, electric, etc.

For measurements done by appropriate sensors of the controllable suspension system, such as a pair of pressure sensors in the case of a hydraulic active suspension, it is known to determine the instantaneous state of the controllable suspension system and to deduce a measured quantity therefrom that is representative of the tipping risk. Depending on the instantaneous value of that measured quantity, a safety strategy is implemented to warn the driver or the persons situated near the automotive vehicle and/or to command the specific actuators of the automotive vehicle to avoid tipping thereof (for example, by modifying the speed, the turn angle, the height of the center of gravity, etc.).

However, the measurements done using the sensors of the controllable suspension system do not make it possible, at all times, to determine the instantaneous state of the controllable suspension system. That is for example the case when an active suspension is in the completely retracted state or when the driver changes the height of the center of gravity of the automotive vehicle. The measured quantity is not available. This may last several seconds, which is sufficient for the risk of tipping to no longer be controlled and for the vehicle to roll over.

The inventors then sought an alternative to calculating a measured quantity representative of the tipping risk.

They then applied, to an automotive vehicle, the results that they obtained in the case of an all-terrain vehicle and which are reported in the article "Rollover prevention system dedicated to ATVs on natural ground". This article discloses a method making it possible to calculate an estimated quantity representative of the tipping risk of an ATV. The ATVs equipped with a system including a processing chain making it possible to acquire kinematic measurements relative to the ATV, then process them via a dynamic module of the behavior of the ATV, so as to estimate an instantaneous value of the estimated quantity.

The results of the implementation of such a processing chain on a grape harvesting machine, as a particular example of an automotive vehicle, are described in the article "Preserving stability of huge agricultural machines with internal mobilities: application to a grape harvester". This article is referred to as Article II below.

However, the inventors have observed that merely transcribing the algorithm used for the case of an ATV was not sufficient in the case of an automotive vehicle. Indeed, in that case, the dynamic model used in the processing chain depends on parameters, such as the height of the center of gravity and the total mass of the vehicle.

These two parameters varying significantly during the use of the automotive vehicle (for example, use of hoppers, vats that are emptied or filled, etc.), the dynamic model evolves over time. As a result, a dynamic model whose parameters are set at the beginning of a session leads to an instantaneous value of the estimated quantity that deviates from the real value. It therefore cannot be used as a variable on which to base the operation of a safety means seeking to avoid the rollover of the automotive vehicle.

The invention therefore aims to resolve this problem.

To that end, the invention relates to a method for reducing the rollover risk of an automotive vehicle including a controllable suspension system, characterized in that it includes:
  a first step of calculating, on the basis of a plurality of signals delivered by sensors of the controllable suspension system, a measured quantity TCm as an active value TC of a load transfer;
  a second step of calculating an estimated quantity TCe, on the basis of signals delivered by kinematic sensors placed onboard the vehicle and a dynamic model of the vehicle, said estimated quantity being taken as an active value of the load transfer when the measured quantity is not available;
  a step of evaluating the rollover risk on the basis of the active value TC of the load transfer; and, in the event of increased rollover risk,
  a step of the emission of a safety signal.

According to specific embodiments, the method includes one or more of the following features, considered alone or according to all technically possible combinations:
  when the measured quantity is available, the method includes a step for recalibrating at least one parameter of the dynamic model of the vehicle used in the second calculation step, said recalibration step consisting of:
    evaluating a deviation between the measured quantity and the estimated quantity; and, when said deviation exceeds a threshold value,
    developing a law of evolution over time of said parameter, said law tending to reduce the deviation; and, when the measured quantity is available,
    modifying, upon each iteration of the second calculation step, the parameter of the dynamic model of the vehicle by using the variation law.
  the parameter of the dynamic model M of the vehicle is the mass G or the height of the center of gravity H.
  the time evaluation law for the height H of the center of gravity is given by a relationship of the type:

$$\Delta H = \gamma_H \frac{\delta TC}{\delta H} e(t),$$

and the time evaluation law for the mass G is given by a relationship of the type:

$$\Delta G = \gamma_G \frac{\delta TC}{\delta G} e(t),$$

where e(t) is the deviation, at the current moment, between the measured load transfer TCm and the estimated load transfer TCe, $$\frac{\delta TC(G)}{\delta G}$$

is a variation as a function of the mass G of a known relationship TC(G) between the mass and the load transfer;

$$\frac{\delta TC(H)}{\delta H}$$

is a variation as a function of the height H of a known relationship TC(H) between the height and the load transfer, and γ is a predetermined or dynamically evaluated weight.

the dynamic model of the vehicle including two parameters, i.e., the mass and the height of the center of gravity, the method includes a step for weighting the time evolution laws of each of those two parameters using a coefficient resulting from a likelihood calculation of the cause of the need for recalibration.

the controllable suspension system including active suspensions, the measured quantity is calculated from signals representative of a force generated by each of the active suspensions.

the estimated quantity is calculated from the following signals:
 a longitudinal speed, delivered by a Doppler radar;
 a longitudinal incline angle and a transverse incline angle of the vehicle, delivered by two inclinometers;
 an instantaneous speed of rotation relative to a vertical axis, delivered by an inertial unit; and
 for each wheel, a turning angle, delivered by a wheel angle sensor.

the recalibration step makes it possible to indirectly estimate the instantaneous mass of said vehicle.

the safety signal is taken into account in an actuating step of a controllable attitude correction system, so as to avoid rollover of the vehicle.

the safety signal is taken into account in a step for regulating the propulsion and/or steering means of the vehicle, so as to prevent rollover of the vehicle.

The invention also relates to an information recording medium, characterized in that it includes instructions for carrying out a method for reducing the rollover risk of an automotive vehicle including a controllable suspension system, according to the preceding method, when the instructions are executed by an electronic computer.

The invention also relates to a system for reducing the rollover risk of an automotive vehicle including a controllable suspension system, including an onboard computer, characterized in that the onboard computer is programmed to execute a method according to the preceding method.

Preferably, the system includes:
 a Doppler radar able to deliver a longitudinal speed;
 two inclinometers able to deliver a longitudinal incline angle and a transverse incline angle of the vehicle;
 an inertial unit able to deliver an instantaneous speed of rotation relative to a vertical axis; and
 for each wheel, a wheel sensor able to deliver a turning angle.

The invention also relates to an automotive vehicle including a controllable suspension system, characterized in that it has an onboard system for reducing the rollover risk according to the preceding system.

Preferably, the safety signal generated at the output of the system is taken into account by an actuating module of the controllable suspension system and/or a regulating module of the propulsion and/or steering means of the vehicle, to avoid rollover of the vehicle.

Thus, advantageously, in the case of an automotive vehicle equipped with a controllable suspension system, the invention results from the use of a first chain to calculate a measured quantity and a second chain to calculate an estimated quantity, the latter being used for safety purposes when the calculated quantity is not available; and, when the measured quantity is available, it is used not only for safety purposes, but also to recalibrate the parameters of the dynamic model in the calculation of the estimated quantity. As a result, the estimated quantity is accurate when the measured quantity is no longer available.

The invention and its advantages will be better understood upon reading the following description, provided solely as an example and done in reference to the appended drawings, in which:

FIG. 2 is an illustration, in the form of a block diagram, of the system of FIG. 1; and FIG. 3 is a graph showing the measured quantity on the one hand, and the estimated quantity on the other hand, with and without recalibration of the parameters of the dynamic model, obtained at the output of the system of FIG. 2 during a usage period of the machine according to FIG. 1.

Figure 1:
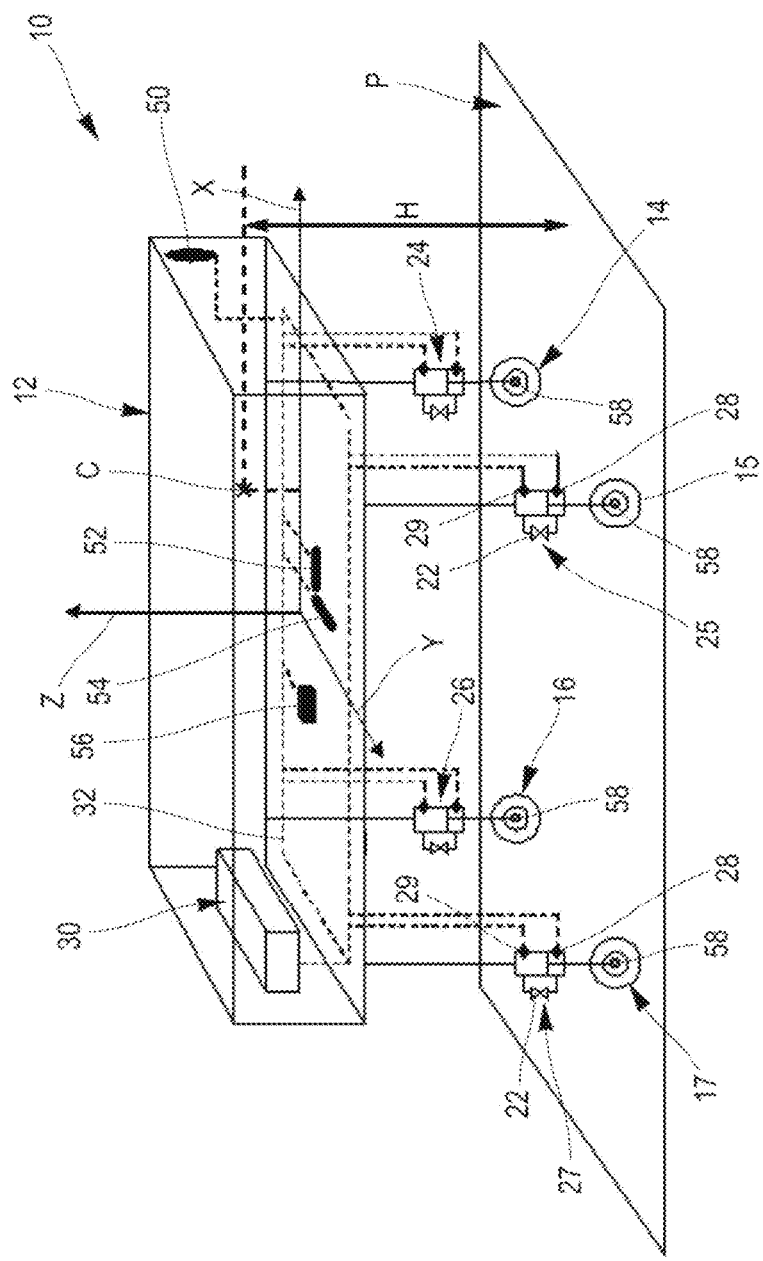
FIG. 1 is a diagrammatic illustration of a grape harvesting machine equipped with active suspensions and a system for implementing a method for reducing the rollover risk of the machine.

In reference to FIG. 1, a grape harvesting machine 10, as an example of an automotive vehicle, moves on a substantially horizontal plane P.

The machine 10 includes a box 12 and four wheels 14 to 17.

As for any vehicle, a reference XYZ is associated with the geometric center of the box 12: the axis X is the longitudinal axis, oriented toward the front of the box; the axis Y is the transverse axis, orienting the body 12 from left to right; and the axis Z is an axis perpendicular to the axis X and Y, oriented upward.

The center of gravity C moves during the use of the machine 10, for example as a function of its attitude and/or its load state, i.e., the total mass G of the vehicle. In FIG. 1, the center of gravity C is shown as resting in the plane XZ.

Each wheel 14 to 17 is coupled to propulsion means (broadly speaking, i.e., traction propulsion, such as the motor, and braking propulsion, such as a motor or brake assembly) and steering means (not shown in the figures).

Each wheel 14 to 17 is connected to the box 12 by means of the active suspension 24 to 27. This set of active suspensions for example belongs to a controllable attitude correction system, as an example of a controllable suspension system.

In the particular case of a hydraulic suspension, an active suspension includes a piston able to slide inside a main chamber of the cylinder. The piston subdivides the main chamber into an upper chamber and a lower chamber.

A two-way electromechanical valve 22 connects the upper chamber to the lower chamber. The force generated by the active suspension then depends on the state of the valve. The state of the valve is commanded by the application of an appropriate set point.

The difference in pressures between the upper chamber and the lower chamber is indicative of the state of the valve. Thus, each active suspension includes a first pressure sensor 28 able to generate a signal corresponding to the measurement of the pressure in the lower chamber and a second pressure sensor 29 able to generate a signal corresponding to the measurement of the pressure in the upper chamber.

Alternatively, other types of active suspensions may be considered (in particular, electric or pneumatic) and other types of sensors may be used in order to make it possible to determine the instantaneous state of the set of suspensions.

The signals emitted by the different pressure sensors are transmitted, via a communication network 32 of the machine 10, such as the CANBus network, to an onboard computer 30.

Furthermore, the machine 10 is equipped with different kinematic sensors.

In the embodiment currently considered, it includes:
- a Doppler radar 50 making it possible to measure linear movement speed of the machine along the axis X;
- a first inclinometer 52 making it possible to measure the angle between the axis X and a horizontal plane;
- a second inclinometer 54, making it possible to determine the angle between the axis Y and a horizontal plane;
- an inertial unit 56, making it possible to determine the instantaneous speed of rotation of the machine around the axis Z.

Preferably, each wheel is equipped with an angle sensor 58 making it possible to measure the turning angle of the wheel.

These different kinematic sensors 50 to 58 emit measurement signals intended for the computer 30, via the network 32.

The computer 30 includes a coupling means, such as a processor, and storage means, such as a random access memory and a read-only memory. The processor is able to execute the instructions from computer programs, which are stored in the read-only memory.

Among the programs stored in the storage means, the computer 30 includes a program 100 for evaluating the rollover risk, which will now be described.

As shown in FIG. 2, the system for evaluating the rollover risk includes the pressure sensors 28 and 29, the kinematic sensors 50 to 58 and a computer 30 programmed with the program 100.

The program 100 includes a first processing chain 110, a second processing chain 120 and a recalibration chain 130.

The first processing chain 110 makes it possible to acquire measurement signals emitted by the different pressure sensors 28 and 29 of the active suspensions 24 to 27.

For each pair of pressure sensors of an active suspension, a different module 112 makes it possible to calculate a pressure difference indicative of the state of the corresponding active suspension.

The four pressure differences are applied at the input of a calculation module 114 capable of delivering a raw measured value of the load transfer TCb.

The equation used is the following equation (1):

$$TC_b = \frac{P_{14} - P_{15} + \alpha(P_{16} - P_{17})}{P_{14} + P_{15} + \alpha(P_{16} + P_{17})}$$

Where is a coefficient representative of the structural difference between the front suspensions 24 and 25 and rear suspensions 26 and 27 of the machine 10; $P_{14}$ is the pressure difference measured in the active suspension of the front left wheel 14, $P_{15}$ is that in the suspension of the front right wheel, $P_{16}$ that in the suspension of the rear left wheel, and $P_{17}$ is that in the suspension of the rear left wheel.

Lastly, the first chain 110 includes a verification module 116 using, as input, the raw measured value of the load transfer TCb and delivering, as output, a measured value of the load transfer TCm. The module 116 verifies that the raw measured value is situated in a validity range. If it is, the measured value of the load transfer TCm is equal to the raw value TCb. Otherwise, the measured value of the load transfer TCm is set to zero.

The second processing chain 120 makes it possible to acquire measurement signals the different kinematic sensors 50 to 58. The corresponding measurement signals are applied at the input of a calculation module 124 able to deliver an estimated value of the load transfer TCe.

The module 124 implements a dynamic model M of the behavior of the machine 10. This model is described in the aforementioned Article II.

This dynamic model M is parametric. It depends on the height H of the center of gravity C relative to a mean plane of the wheels 14 to 17 and the total mass G of the machine. These parameters evolve over time as a function of the use of the machine 10.

Thus, the module 124 uses, as input at each performance moment, the instantaneous values of the mass G and the height H delivered at the output of the recalibration chain 130.

The program 100 includes a comparison module 140 able to compare the measured value of the load transfer TCm to the zero value. If the measured value of the load transfer TCm is not equal to zero, this means that the measured value is available. Then the module 144 assigns the measured value of the load transfer TCm to the instantaneous value of the load transfer TC.

Otherwise, when the measured value of the load transfer TCm is equal to zero, this means the measured value of the load transfer TCm is not available. In that case, the module 142 assigns the estimated value of the load transfer TCe to the instantaneous value of the load transfer TC.

The program 100 includes a module for evaluating the rollover risk 150 using, as input, the instantaneous value of the load transfer TC and delivering, as output, a safety signal S. The signal S is for example emitted when the instantaneous value of the load transfer TC is greater, in absolute value, than 0.8.

The recalibration chain 130 makes it possible, when the measured value of the load transfer TCm is available, to recalibrate the values of the parameters H and G used in the dynamic model M of the second chain 120.

To that end, the recalibration chain 130 includes a deviation calculating module 132 able to calculate an instantaneous deviation e(t), by difference between the measured value TCm and the estimated value TCe of the load transfer.

The chain 130 includes a comparator 133 making it possible to determine whether the deviation e(t) is greater than a threshold deviation e0. If not, the module 134 assigns, as instantaneous values of the mass G(t) and height H(t) at the current moment t, the values of the mass G(t−1) and the height H(t−1) at the preceding moment t−1.

If yes, the module 135 of the chain 130 is executed. The module 135 is able to determine a variation of the mass ΔG or the height ΔH as a function of a time evolution law. In the currently preferred embodiment, this law is expressed as follows:

$$\Delta H = \gamma_H \frac{\delta TC(H)}{\delta H} e(t)$$

$$\Delta G = \gamma_G \frac{\delta TC(G)}{\delta G} e(t)$$

Where e(t) is the deviation, at the current moment, between the measured load transfer TCm and the estimated load transfer TCe, $$\frac{\delta TC(G)}{\delta G}$$

is the variation as a function of the mass G of a known relationship TC(G) between the mass and the load transfer;

$$\frac{\delta TC(H)}{\delta H}$$

is the variation as a function of the height H of a known relationship TC(H) between the height and the load transfer, and γ is a predetermined or dynamically evaluated weight, as will be described below.

The module 136 of the recalibration chain 130 is able to assign, as instantaneous values of the mass G(t) and the height H(t) of the current moment t, the values of the mass G(t−1) and the height H(t−1) at the preceding moment t−1 increased by the variation of the mass ΔM or the height ΔH determined by the module 135.

The updated values of the parameters G and H are applied at the input of the module 124.

Alternatively, the recalibration chain 130 includes a weighting module 137 for the time evolution laws of each of the two parameters of the model M, using a coefficient γ whereof the value results from a calculation of the likelihood of the cause of the deviation between TCm and TCe.

The computer 30 includes a program 200 for reducing the rollover risk capable of taking the signal S into account delivered at the output of the program 100 for evaluating that risk.

The program 200 includes a module 210 for actuating the controllable attitude correction system of the vehicle. Based on the signal S and optionally on the current value of the load transfer TC, the module 210 is capable of calculating different set points for control parameters of the active suspensions 24 to 27. The set points thus determined are applied to the valves of the active suspensions to be taken into account immediately so as to modify the force generated by each suspension and adapt the height of the center of gravity (in particular to lower it) so as to avoid rollover of the vehicle.

The program 200 includes a module 220 for regulating the speed of the vehicle. Based on the signal S and optionally the current value of the load transfer TC, the module 220 is able to calculate different set points for parameters for regulating the propulsion means (engine rating, brake activation, etc.) and/or steering means of the vehicle (turn angle, etc.). The set points thus determined are applied at the input of the propulsion and/or steering means of the vehicle to be taken into account immediately so as to modify the speed of the vehicle (in particular so as to reduce its transverse acceleration) with the aim of avoiding rollover of vehicle.

The method resulting from the implementation of the preceding program 100 will now be described.

Upon each execution, the modules of the first processing chain 110 are executed.

After a step for acquiring measurements done by the various pressure sensors 28, 29 of the active suspensions 24 to 27, a pressure difference is calculated for each pair of pressure sensors of an active suspension.

The four determined pressure differences are next used to calculate a raw measured value of the load transfer TCb. This calculation is based on equation (1) above.

Lastly, during a verification step, the raw measured value of the load transfer TCb is compared to a validity range. When the measured value is in that range, the measured value of the load transfer TCm is equal to the raw value TCb. On the contrary, when the measured value is outside that range, the measured value of the load transfer TCm is set at zero.

In parallel, the modules of the second chain 120 are executed.

After the acquisition of the measurements done by the different kinematic sensors 50 to 58, the calculation module 124 is executed to calculate an estimated value of the load transfer TCe.

The dynamic model M used by the module 124 takes the values of the mass G(t) and the height H(t) of the center of gravity into account at the current moment t.

The execution of the program 100 continues with a step for comparing the measured value of the load transfer TCm to the zero value. If the measured value of the load transfer TCm is not equal to zero, that means that the measured value is available. Then the module 144 is executed so as to assign the measured value of the load transfer TCm to the instantaneous value of the load transfer TC.

Otherwise, when the measured value of the load transfer TCm is equal to zero, that means that the measured value of the load transfer TCm is not available. In that case, the module 142 is executed so as to assign the estimated value of the load transfer TCe to the instantaneous value of the load transfer TC.

In the following step, the module 150 is executed to determine, from the current value of the load transfer TC, whether there is a rollover risk. If the instantaneous value of the load transfer TC is, in absolute value, greater than 0.8, there is a rollover risk. A safety signal S is then emitted.

Upon each execution cycle of the modules of the first and second processing chains 110 and 120, and when the measured value of the load transfer TCm is available, the modules of the recalibration chain 130 are executed to recalibrate the value of the parameters H and G used in the dynamic model M.

To that end, a calculation step leads to the determination of the deviation by difference between the measured value TCm and the estimated value TCe of the load transfer.

Then, the deviation e(t) thus obtained is compared to a threshold deviation e0. If the deviation is lower than the threshold, the module 134 is executed so as to assign, as values of the mass G(t) and the height H(t) at the current moment t, the values of the mass G(t−1) and the height H(t−1) at the preceding moment t−1.

If, however, the deviation exceeds the threshold, the module 135 is executed so as to determine the variation of the mass or height as a function of a time evolution law.

Then, in the following step, the module 136 is executed to assign, as values of the mass G(t) and the height H(t) at the current moment t, the values of the mass G(t−1) and the height H(t−1) at the preceding moment t−1, increased by the variation of the mass or the height determined by the module 135.

The updated values of the parameters T and H are available for the next execution of the module 124.

Alternatively, an additional step makes it possible to weight the time evolution law of each of the two parameters using a coefficient resulting from a likelihood calculation of the cause of the need for recalibration.

In this way, the dynamic model M is updated to effectively describe the behavior of the machine.

This is shown in FIG. 3. The latter figure shows, in graph form, the results of the implementation of the present method during a round-trip of 200 m, done at a speed of 1.5 m/s, following a substantially straight path in a direction perpendicular to the slope of approximately 15° of the terrain.

The graph shows the measured value of the load transfer TCm as a function of time. In the left part of the graph, the active suspensions often return to abut. TCm is consequently often unavailable (sawtooth form of the signal, since TCm is often equal to 0).

In the central part, between approximately 90 m and 110 m, the grape harvesting machine performs a half turn. The operator deliberately blocks the attitude correction system such that TCm is completely unavailable (TCM=0).

Lastly, in the right part, on the return path, the active suspensions are adjusted to a value other than that of the outgoing journey, such that they return less often to an abutting position. TCm is available at practically every moment.

The graph TCe1 is also shown for the estimated value of the load transfer, but without performing the recalibration step for the parameters of the dynamic model. This value estimate is far from the measured value when the latter is available. It therefore cannot be used to evaluate the rollover risk when the measured value is not available.

The graph TCe2 is also shown of the estimated value of the load transfer with implementation of the recalibration step for the parameters of the dynamic model. This estimated value is very close to the measured value and follows its variations. They can therefore be used as quantity representative of the rollover risk when the measured value is not available.

It will be noted that one indirectly obtains an instantaneous value G(t) of the total mass of the vehicle. This information can advantageously be used by other systems equipping the vehicle such that their operation can be optimized, in real-time, based on an actual value of the mass of the vehicle.

The safety signal S is taken into account by other programs executed on the computer 30, such as the program 200 for reducing the rollover risk.

Thus, the execution of the module 210 for actuating the controllable attitude correction system of the vehicle calculates different set points designed to be applied to the active suspensions, for example to reduce the height of the center of gravity.

Thus, the execution of the module 220 for regulating the speed of the vehicle calculates different set points for regulating parameters of the propulsion and/or steering means of the vehicle. The set points thus determined are applied at the input of those means in order, for example, to reduce the transverse acceleration of the vehicle.

Advantageously, the execution of the program 200 provides an arbitration leading to a distribution of the reduction of the rollover risk between the actuation of the attitude correction system and that of the propulsion and/or steering means.

The invention claimed is:

1. A method for reducing the rollover risk of an automotive vehicle (10) including a controllable suspension system (24-27), which comprises:
    a first step of calculating, on the basis of a plurality of signals delivered by sensors (28, 29) of the controllable suspension system, a measured quantity (TCm) as an active value (TC) of a load transfer;
    a second step of calculating an estimated quantity (TCe), on the basis of signals delivered by kinematic sensors (50-58) placed onboard the vehicle (10) and a dynamic model (M) of the vehicle, said estimated quantity being taken as an active value of the load transfer when the measured quantity is not available;
    a step of evaluating the rollover risk on the basis of the active value (TC) of the load transfer; and, in the event of increased rollover risk, and
    a step of the emitting a safety signal (S), the safety signal (S) being taken into account in i) an actuating step of a controllable attitude correction system or ii) a step for regulating the propulsion and/or steering means of the vehicle, so as to avoid rollover of the vehicle,
    wherein, when the measured quantity (TCm) is available, the method includes a recalibration step for recalibrating at least one parameter (H, G) of the dynamic model (M) of the vehicle used in the second calculation step, said recalibration step comprising:
    evaluating a deviation between the measured quantity (TCm) and the estimated quantity (Tce), and, when said deviation exceeds a threshold value (e0),
    developing a law of evolution over time of said at least one parameter, the time evolution law tending to reduce the deviation; and, when the measured quantity (TCm) is available, and
    modifying, upon each iteration of the second calculation step, the parameter of the dynamic model of the vehicle by using the time evolution law.

2. The method according to claim 1, wherein said at least one parameter of the dynamic model (M) of the vehicle (10) is the mass (G) or the height of the center of gravity (H).

3. The method according to claim 2, wherein the time evolution law for the height H of the center of gravity is given by a relationship of the type:

$$\Delta H = \gamma_H \frac{\delta TC}{\delta H} e(t),$$

and the time evolution law for the mass G is given by a relationship for the type:

$$\Delta G = \gamma_G \frac{\delta TC}{\delta G} e(t),$$

where e(t) is the deviation, at the current moment, between the measured load transfer TCm and the estimated load transfer TCe, $$\frac{\delta TC(G)}{\delta G}$$

is a variation as a function of the mass G of a known relationship TC(G) between the mass and the load transfer;

$$\frac{\delta TC(H)}{\delta H}$$

is a variation as a function of the height H of a known relationship TC(H) between the height and the load transfer, and γ is a predetermined or dynamically evaluated weight.

4. The method according to claim 3, wherein, the dynamic model (M) of the vehicle (10) including two parameters, said two parameters being the mass (G) and the height of the center of gravity (H), the method includes a step for weighting the time evolution laws of each of those two parameters using a coefficient resulting from a likelihood calculation of the cause of the need for recalibration.

5. The method according to claim 1, wherein, the controllable suspension system including active suspensions, the measured quantity (TCm) is calculated from signals representative of a force generated by each of the active suspensions (24-27).

6. The method according to claim 1, wherein the estimated quantity (TCe) is calculated from the following signals:
 a longitudinal speed, delivered by a Doppler radar (50);
 a longitudinal incline angle and a transverse incline angle of the vehicle, delivered by two inclinometers (52, 54);
 an instantaneous speed of rotation relative to a vertical axis, delivered by an inertial unit (56); and
 for each wheel, a turning angle, delivered by a wheel angle sensor (58).

7. The method according to claim 1, wherein the recalibration step makes it possible to indirectly estimate the instantaneous mass (G(t)) of said vehicle.

8. An information recording medium, which includes instructions for carrying out a method for reducing the rollover risk of an automotive vehicle including a controllable suspension system, according to claim 1, when the instructions are executed by an electronic computer (30).

9. A system for reducing the rollover risk of an automotive vehicle (10) including a controllable suspension system (24-27), including an onboard computer (30), wherein the onboard computer is programmed to execute a method according to claim 1.

10. The system according to claim 9, including:
 a Doppler radar (50) able to deliver a longitudinal speed;
 two inclinometers (52, 54) able to deliver a longitudinal incline angle and a transverse incline angle of the vehicle;
 an inertial unit (56) able to deliver an instantaneous speed of rotation relative to a vertical axis; and
 for each wheel, a wheel sensor (58) able to deliver a turning angle.

11. An automotive vehicle including a controllable suspension system, wherein the vehicle has an onboard system for reducing the rollover risk according to claim 9.

12. The vehicle according to claim 11, wherein said safety signal (S) generated at the output of the system is taken into account by an actuating module (210) of the controllable suspension system and/or a regulating module (220) of the propulsion and/or steering means of the vehicle, to avoid rollover of the vehicle.

* * * * *